(12) United States Patent
Wang et al.

(10) Patent No.: US 7,965,934 B2
(45) Date of Patent: Jun. 21, 2011

(54) SWITCHING MECHANISM FOR CAMERA DEVICE

(75) Inventors: Tai-Kuo Wang, Taipei (TW); Wen-Chi Wang, Taipei (TW); Julian Lin, Taipei (TW)

(73) Assignee: VTC Electronics Corp., Taipei (TW)

( * ) Notice: Subject to any disclaimer, the term of this patent is extended or adjusted under 35 U.S.C. 154(b) by 41 days.

(21) Appl. No.: 12/433,945

(22) Filed: May 1, 2009

(65) Prior Publication Data

US 2010/0278525 A1 Nov. 4, 2010

(51) Int. Cl.
*G03B 17/00* (2006.01)

(52) U.S. Cl. .......................... 396/75; 348/360; 74/89.37

(58) Field of Classification Search .......... 348/360–361; 396/75; 74/424.78, 89.37, 424.94
See application file for complete search history.

(56) References Cited

U.S. PATENT DOCUMENTS

| | | | | |
|---|---|---|---|---|
| 3,665,364 A | * | 5/1972 | Maurice | 338/180 |
| 5,422,700 A | * | 6/1995 | Suda et al. | 396/123 |
| 6,317,562 B1 | * | 11/2001 | Aoshima | 396/72 |
| 6,817,788 B1 | * | 11/2004 | Negishi et al. | 396/505 |
| 6,961,086 B1 | * | 11/2005 | Ichikawa | 348/223.1 |
| 7,663,690 B2 | * | 2/2010 | Kurosawa | 348/370 |
| 7,886,630 B2 | * | 2/2011 | Tomaru et al. | 74/493 |
| 2002/0047408 A1 | * | 4/2002 | Tanaka | 310/99 |

FOREIGN PATENT DOCUMENTS

| | | | | |
|---|---|---|---|---|
| JP | 07107335 A | * | 4/1995 | |
| JP | 2005208117 A | * | 8/2005 | |

* cited by examiner

*Primary Examiner* — Clayton E Laballe
*Assistant Examiner* — Leon W Rhodes
(74) *Attorney, Agent, or Firm* — Roger H. Chu

(57) ABSTRACT

A switching mechanism for a camera device includes a driving device, a first screw bar connecting to the driving device, a second screw bar connecting to the first screw bar, and a lead screw having an end coupled with the second screw bar. The first screw bar is driven by the driving device via a screw thread thereof, and the second screw bar is driven by the first screw bar via a screw thread thereof, thereby driving the lead screw for rotation. The screw nut is disposed on the lead screw and moved back and forth via the rotation of the lead screw. Two stop blocks disposed at two ends of the lead screw respectively are to limit two positions of the moved screw nut while the screw nut is moved beyond a threaded area of the lead screw, upon which time the screw nut is slightly engaged with the lead screw.

6 Claims, 3 Drawing Sheets

SWITCHING MECHANISM FOR CAMERA DEVICE

BACKGROUND OF THE INVENTION

1. Technical Field

The present invention relates to a switching mechanism for a camera device and, more particularly, to a switching mechanism capable of switching filters by means of a simple mechanism so that little noise is produced, and no complicated control units are required.

2. Description of Related Art

For a general camera equipped with a CCD or CMOS sensing element to maintain a satisfactory image-capturing state in daytime as well as at night, it is necessary to switch filters for diurnal and nocturnal use of the camera respectively such that high image fidelity is achieved in the day, and clear pictures can be taken during nighttime. Therefore, filter-switching mechanisms, i.e., structures with a filter-switching function, are commonly provided in camera devices.

A filter-switching mechanism can be controlled by several methods, and from the perspective of control, these methods are divided into the following two categories:

- A. Closed circuit control methods: Control is carried out with the assistance of feedback signals. In other words, after a motor is activated to drive a mechanism, and the driven mechanism reaches a predetermined position or condition, a feedback signal is sent to a control unit so as to adjust a driving state of the motor. With such control methods, the state of a driven device can be controlled, thus enabling stable operation. However, this kind of methods is disadvantaged by their relatively high costs and bulkiness.
- B. Open circuit control methods: According to these control methods, a motor drives a mechanism in a one-way manner while an input unit takes charge of active control, and it is impossible to know the state of a device being controlled. While devices based on this kind of methods is simple, inexpensive, require no special controllers and feedback mechanisms, they will have to deal frequently with the problem that, in the absence of position-detecting devices (such as switches, sensors), if a movement relation between an enabling device (such as a motor) and a driven device is not cut off when the driven device is hindered, devices such as the motor or a transmission mechanism in the motion link (most probably the motor) may be damaged. To prevent such damage, a mechanism for making and breaking the aforesaid movement relation must exist in the control mechanism described above. Now that retaining and controlling are frequently administered by means of friction, noise is inevitably produced. Hence, the methods under this category are advantageous in being capable of accomplishing the target movement with a relatively compact and simple mechanism and a relatively low cost, but are inherently flawed, in terms of control, by failing to control the state of a controlled object and the noise problem.

Hence, the inventor of the present invention, based on years of experience, proposes a switching mechanism for a camera device so as to solve the aforesaid problems.

BRIEF SUMMARY OF THE INVENTION

The open circuit control methods have long been troubled by the stability and noise issues. If the advantages of the open circuit control methods can be maintained from the perspective of design while the resultant drawbacks are eliminated, the quality and competitiveness of products will be tremendously enhanced. The basic concept of the present invention is to make use of the relatively precise contact behavior, and the relatively stable positioning property, between a screw thread and a screw nut, in conjunction with the high speed reduction ratio of a worm and a worm gear, so as to produce an open circuit control mechanism with low noise and high stability that is conveniently applicable to various systems.

The primary objective of the present invention is to provide a switching mechanism for a camera device such that filters can be switched by a simple mechanism, with reduced noise and without complicated control units.

A switching mechanism for a camera device includes a driving device, a first screw bar connecting to the driving device, a second screw bar connecting to the first screw bar, and a lead screw which one end is coupled with the second screw bar. The first screw bar is driven by the driving device via a screw thread thereof, and the second screw bar is driven by the first screw bar via a screw thread thereof such that the driven second screw bar then drives the lead screw for rotation. A screw nut is disposed on the lead screw and moved back and forth along the lead screw via the rotation thereof. Two stop blocks disposed at two ends of the lead screw respectively are to limit two positions of the moved screw nut while the moved screw nut is moved to be out of a threaded area of the lead screw. Upon the screw nut being out of the threaded area of the lead screw, the screw nut and the lead screw are slightly engaged with each other.

DETAILED DESCRIPTION OF THE INVENTION

The present invention relates to a switching mechanism for a camera device and will be best understood by referring to the following detailed description of an illustrative embodiment in conjunction with the accompanying drawings.

Figure 1:
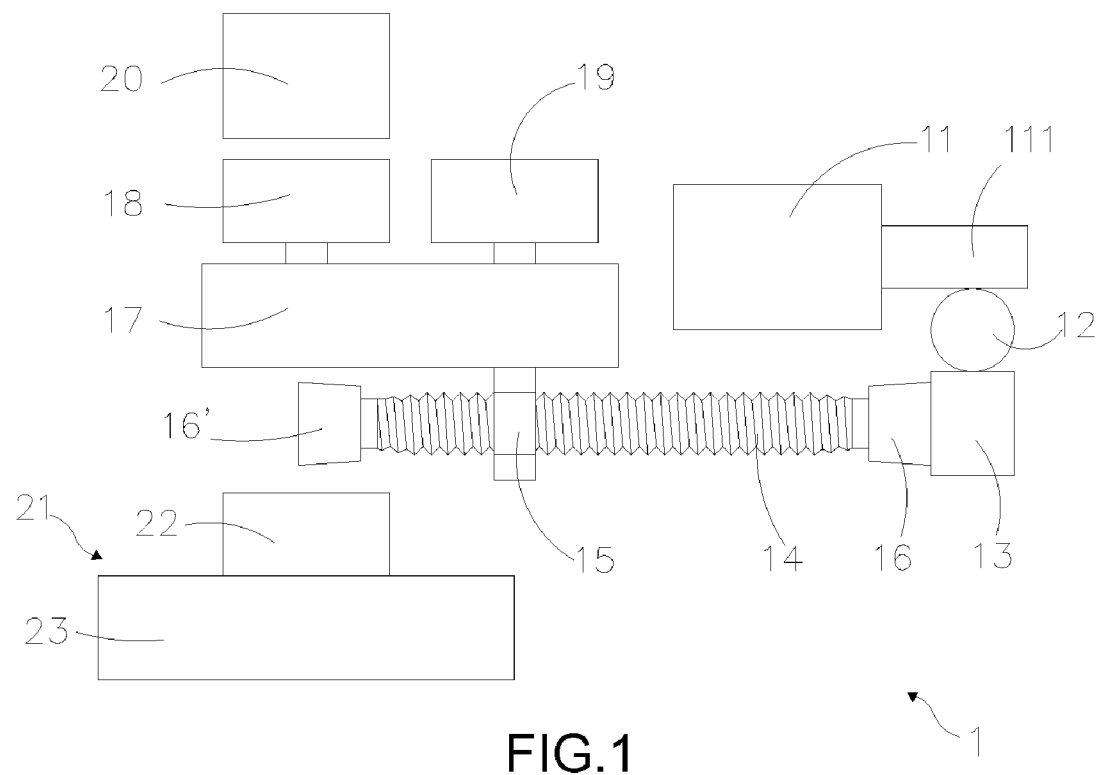
FIG. 1 is a schematic top view of a switching mechanism for a camera device according to the present invention.
Figure 2:
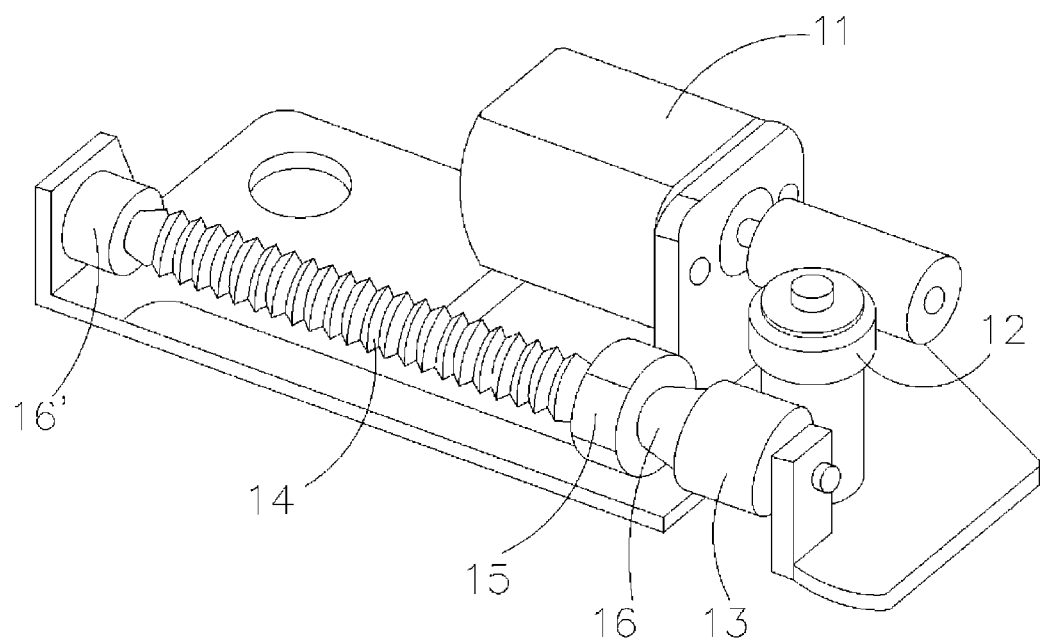
FIG. 2 is a perspective view of the switching mechanism for a camera device according to the present invention.
Figure 3:
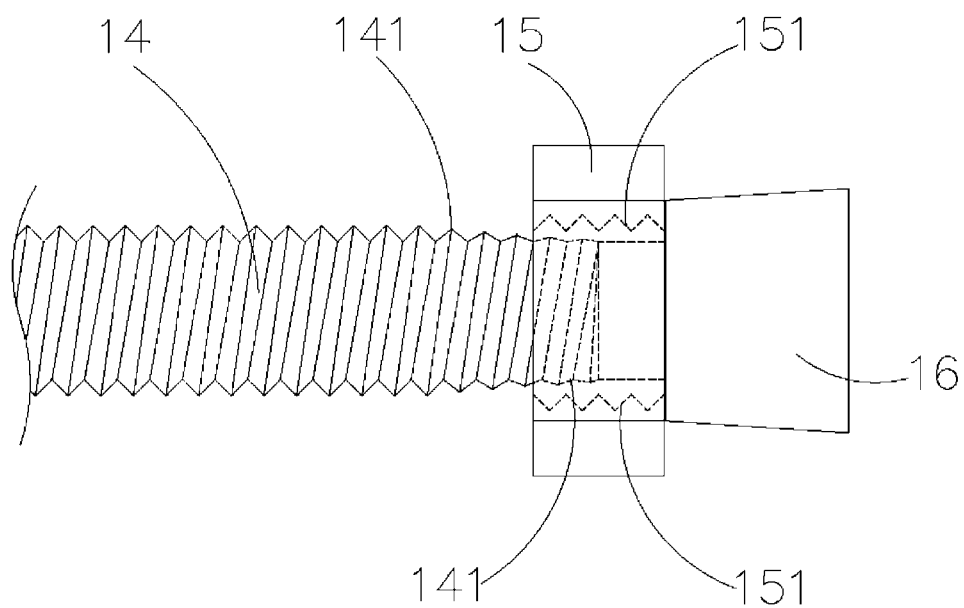
FIG. 3 is a schematic drawing showing slight engagement between a screw nut and a lead screw of the switching mechanism for a camera device according to the present invention.

Please refer to FIGS. 1, 2, and 3 for a schematic top view, a perspective view, and a schematic drawing showing slight engagement between a screw nut and a lead screw, of a switching mechanism 1 for a camera device according to the present invention. The switching mechanism 1 for a camera device according to the present invention includes: a driving device 11, which is a motor for example; a first screw bar 12 connecting to the driving device 11; a second screw bar 13 connecting to the first screw bar 12; and a lead screw 14 which one end is coupled with the second screw bar 13. Therein, the first screw bar 12 is driven by the driving device 11 via a screw thread of a lead screw 111 of the driving device 11, and the second screw bar 13 is driven by the first screw bar 12 via a screw thread thereof such that the driven second screw bar 13 then drives the lead screw 14 as well for rotation. A screw nut 15 is disposed on the lead screw 14 and moved back and forth along the lead screw 14 via the rotation thereof. Two stop blocks 16 and 16' disposed at two ends of the lead screw 14 respectively are to limit two positions of the moved screw nut 15 while the moved screw nut 15 is moved to be out of a threaded area (not shown in the drawings) of the lead screw 14, so that the screw nut 15 is slightly engaged with the lead screw 14, as shown in FIG. 3, wherein a screw thread 151 of the screw nut 15 is separated from a screw thread 141 of the lead screw 14 by a small distance. In the embodiment shown in FIG. 3, the screw nut 15 has been moved to the stop block 16, which serves as a limit in position of the screw nut 15, and in consequence the screw nut 15 is slightly engaged with the lead screw 14 only by friction between terminal ends of the screw threads thereof, thus producing little noise. In addition, when the motor 11 rotates in the opposite direction, the lead screw 111, the first screw bar 12, the second screw bar 13, and the lead screw 14 are driven again, thereby driving the screw thread 151 of the screw nut 15 to re-engage with the screw thread 141 of the lead screw 14, and thus moving the screw nut 15 toward the stop block 16'. The screw nut 15 further connects to a translation mechanism 17 that in turn connects to a filter 18 and a glass plate 19. When moved along the lead screw 14, the screw nut 15 directly drives the translation mechanism 17 such that the filter 18 and the glass plate 19 are moved to a predetermined position relative to a position at which the screw nut 15 is slightly engaged with the lead screw 14. Besides, a lens 20 is provided in front of the filter 18 or the glass plate 19 while an image-capturing device 21 is provided behind the filter 18 or the glass plate 19. The image-capturing device 21 includes a CCD sensing element 22 and a printed circuit board 23. It is understood that the CCD sensing element 22 may also be implemented as a CMOS sensing element.

It should be noted that while the switching mechanism 1, the lead screw 111, the firs screw bar 12, the second screw bar 13, the lead screw 14, the screw nut 15, and the stop blocks 16, 16' are shown in FIG. 1 as on the same level with one another due to the top view perspective, the aforesaid components are not so arranged in fact. Furthermore, the connection between the screw nut 15 and the translation mechanism 17 is not limited in position as long as the space through which light enters the sensing element 22 is not interrupted.

It can be understood from the abovementioned structure how the filter 18 and the glass plate 19 are switched. Thus, not only is a general camera device allowed to use the filter and the glass plate according to daytime and nighttime lighting conditions, but also the problems of excessive noise, resistance, and difficulty in resetting are solved. Moreover, the switching mechanism according to the present invention has a simple structure, incurs a low cost, and is easily assembled so as to require a low maintenance cost.

In conclusion, the present invention overcomes the problem of performing non-positive motion (with the design objective being to break up the aforesaid frictional engagement at specific positions) while addressing the vibration and noise issues during disengagement and engagement. Besides, the design of the present invention offers many advantages in application, as described in detail below:

A. A worm and a worm gear are used as speed-reducing gears so as to increase the speed reduction ratio. Application of the worm and the worm gear to the switching mechanism according to the present invention also enhances reliability of movement.

B. The overall structure is downsized due to the concept of the present invention, and in consequence the switching mechanism according to the present invention is easily modularized into an inexpensive, reliable, and useful module in open circuit control.

C. When such module is applied to linear reciprocating motion, the moving path of a reciprocating mechanism can be determined by merely controlling the effective lengths of the screw bars and the limiting positions of the screw nut.

Hence, the invention disclosed in the present patent application provides a simple solution based on the ample experience and ingenuity of the inventor for sufficiently solving the problems in the prior art, and the functions of the present invention do conform to the requirements of novelty and non-obviousness for patent application.

However, the above description is provided only to illustrate the preferred embodiment of the present invention but not to limit the scope of the present invention. In other words, all equivalent changes or modifications which are made according to the appended claims and do not depart from the concept and scope of the present invention should be viewed as further embodiments of the present invention.

What is claimed is:

1. A switching mechanism for a camera device, comprising:
    a driving device, having a lead screw;
    a first screw bar, connecting to the lead screw of the driving device;
    a second screw bar connecting to the first screw bar; and
    a lead screw which one end is coupled with the second screw bar;
    wherein the first screw bar is driven by the driving device via the lead screw, the second screw bar being driven by the first screw bar via a screw thread thereof such that the driven second screw bar then drives the lead screw for rotation, and a screw nut disposed on the lead screw being moved back and forth along the lead screw via the rotation of the lead screw, wherein two stop blocks disposed at two ends of the lead screw are respectively to limit two positions of the moved screw nut while the moved screw nut is moved to be out of a threaded area of the lead screw, so that upon the screw nut being out of the threaded area of the lead screw and moved to any of the two stop blocks, the screw nut and lead screw are slightly engaged with each other and then a screw thread of the screw nut is separated from a screw thread of the lead screw by a small distance.

2. The switching mechanism of claim 1, wherein the screw nut connects to a translation mechanism connecting to a filter and a glass plate, when moved along the lead screw, directly drives the translation mechanism so as to move the filter and the glass plate to a predetermined position relative to a position at which the screw nut and the lead screw are slightly engaged with each other.

3. The switching mechanism of claim 2, wherein a lens is provided in front of the filter or the glass plate while an image-capturing device is provided behind the filter or the glass plate.

4. The switching mechanism of claim 3, wherein the image-capturing device comprises a CCD sensing element and a printed circuit board.

5. The switching mechanism of claim 3, wherein the image-capturing device comprises a CMOS sensing element and a printed circuit board.

6. The switching mechanism of claim 1, wherein the driving device is a motor.

* * * * *